United States Patent
Lynch (10) Patent No.: US 10,140,013 B2
(45) Date of Patent: Nov. 27, 2018

(54) METHOD, APPARATUS AND COMPUTER PROGRAM PRODUCT FOR CALCULATING A VIRTUAL TOUCH POSITION

(71) Applicant: HERE GLOBAL B.V., Eindhoven (NL)

(72) Inventor: James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/621,639

(22) Filed: Feb. 13, 2015

(65) Prior Publication Data

US 2016/0239172 A1   Aug. 18, 2016

(51) Int. Cl.
*G06F 3/041* (2006.01)
*G06F 3/042* (2006.01)
*G06F 3/044* (2006.01)
*G06F 3/0488* (2013.01)

(52) U.S. Cl.
CPC ........ *G06F 3/04883* (2013.01); *G06F 3/0416* (2013.01)

(58) Field of Classification Search
CPC .......... G06F 3/041; G06F 3/042; G06F 3/044; G06F 3/0488
See application file for complete search history.

(56) References Cited

U.S. PATENT DOCUMENTS

| | | | |
|---|---|---|---|
| 5,327,161 A * | 7/1994 | Logan | G06F 3/03547 345/157 |
| 8,836,648 B2 | 9/2014 | Wilairat | |
| 2004/0150630 A1 * | 8/2004 | Hinckley | G06F 3/0418 345/173 |
| 2009/0278806 A1 | 11/2009 | Duarte et al. | |
| 2011/0202834 A1 | 8/2011 | Mandryk et al. | |
| 2014/0022194 A1 | 1/2014 | Ito | |
| 2014/0118281 A1 * | 5/2014 | Baker | G06F 3/0418 345/173 |

(Continued)

FOREIGN PATENT DOCUMENTS

EP    2 634 678 A1    9/2013

OTHER PUBLICATIONS

*Iphone—Detecting 2 swipes without interrupting touch—Stack Overlow* [online] [retrieved Sep. 26, 2014]. Retrieved from the Internet: <URL: http://stackoverflow.com/questions/14400828/detecting-2-swipes-without-interrupting-touch>. (dated Jan. 18, 2013) 4 pages.

*Primary Examiner* — Michael J Jansen, II
*Assistant Examiner* — Paras D Karki
(74) *Attorney, Agent, or Firm* — Alston & Bird LLP (57) ABSTRACT

A method, apparatus and computer program product are provided for calculating a virtual touch position that is off the physical touch screen display. A user may provide a first swiping gesture in a main portion of a physical touch screen display, and an extended swiping gesture within a predefined threshold distance of an edge of the physical touch screen display. The extended swiping gesture is a continuation of the first swiping gesture. The virtual touch position may be calculated based on a trajectory of the first swiping gesture and/or the distance of the extended swiping gesture. An extended swiping gesture may continue around the edges to enable calculation of a virtual touch position regardless of size constraints of the physical touch screen display.

14 Claims, 10 Drawing Sheets

(56) References Cited

U.S. PATENT DOCUMENTS

| | | | |
|---|---|---|---|
| 2014/0289668 A1* | 9/2014 | Mavrody | G06F 3/04886 715/781 |
| 2015/0042588 A1* | 2/2015 | Park | G06F 3/0412 345/173 |
| 2016/0091308 A1* | 3/2016 | Oliaei | G01B 17/00 367/89 |

* cited by examiner

METHOD, APPARATUS AND COMPUTER PROGRAM PRODUCT FOR CALCULATING A VIRTUAL TOUCH POSITION

TECHNOLOGICAL FIELD

An example embodiment of the present invention relates generally to touch screen devices, and more particularly, to a method, apparatus and computer program product for calculating a virtual touch position.

BACKGROUND

The advance of mobile computing technology has led to user devices becoming common place in every aspect of life. Some individuals carry mobile phones, or even wear mobile smart devices. Many mobile devices are smaller than other devices such as laptops, personal computers, and television monitors. Some applications may be difficult to use on a mobile device due to the small nature of the display screen. Applications requiring user input to a touch screen display may be particularly challenging to use on a mobile device. Games and other highly interactive applications may require precise user inputs to be made to the touch screen interface.

BRIEF SUMMARY

A method, apparatus, and computer program product are therefore provided for calculating a virtual touch position. A method is provided comprising receiving an indication of a first swiping gesture, determining that the first swiping gesture has reached a position within a predetermined threshold distance of an edge of a physical touch screen display, receiving an indication of an extended swiping gesture within the threshold distance of the edge of the physical touch screen display that is a continuation of the first swiping gesture, and in response to receiving the indication of the extended swiping gesture, calculating a virtual touch position that is off the physical touch screen display.

In some examples, the method includes receiving an indication that the extended swiping gesture is no longer within the threshold distance of the edge of the physical touch screen display, and in response to receiving the indication that the extended swiping gesture is no longer within the threshold distance of the edge of the physical touch screen display, recalculating the virtual touch position.

An apparatus is provided, including at least one processor and at least one memory including computer program code, with the at least one memory and the computer program code configured to, with the processor, cause the apparatus to at least receive an indication of a first swiping gesture, determine that the first swiping gesture has reached a position within a predetermined threshold distance of an edge of a physical touch screen display, receive an indication of an extended swiping gesture within the threshold distance of the edge of the physical touch screen display that is a continuation of the first swiping gesture, and in response to receiving the indication of the extended swiping gesture, calculate a virtual touch position that is off the physical touch screen display.

In some examples, the memory and computer program code are further configured to cause the apparatus to receive an indication that the extended swiping gesture is no longer within the threshold distance of the edge of the physical touch screen display, and in response to receiving the indication that the extended swiping gesture is no longer within the threshold distance of the edge of the physical touch screen display, recalculate the virtual touch position.

A computer program product is also provided including at least one non-transitory computer-readable storage medium having computer-executable program code instructions stored therein, with the computer-executable program code instructions comprising program code instructions to receive an indication of a first swiping gesture, determine that the first swiping gesture has reached a position within a predetermined threshold distance of an edge of a physical touch screen display, receive an indication of an extended swiping gesture within the threshold distance of the edge of the physical touch screen display that is a continuation of the first swiping gesture, and in response to receiving the indication of the extended swiping gesture, calculate a virtual touch position that is off the physical touch screen display.

In some examples, the virtual touch position is calculated based on at least a distance of the extended swiping gesture and/or a trajectory, a velocity or an acceleration of the first swiping gesture. In some embodiments, the extended swiping gesture changes direction while remaining within the threshold distance of the edge of the physical touch screen display.

In some examples, two virtual touch points are calculated as a part of a single input. In some embodiments, the virtual touch position is calculated further in response to a release of the extended swiping gesture.

An apparatus is also provided with means for receiving an indication of a first swiping gesture, means for determining that the first swiping gesture has reached a position within a predetermined threshold distance of an edge of a physical touch screen display, means for receiving an indication of an extended swiping gesture within the threshold distance of the edge of the physical touch screen display that is a continuation of the first swiping gesture, and in response to receiving the indication of the extended swiping gesture, means for calculating a virtual touch position that is off the physical touch screen display.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described above, many users of mobile devices may experience difficulty interacting with certain applications. In some instances, a user may wish to make a swiping gesture, characterized by an initial touch of a pointing object to a touch screen and swiping or sliding of the pointing object in any direction while maintaining contact with the touch screen. In some instances a user may wish to continue a swiping gesture beyond the constraints of the touch screen. That is, the user may not have adequate space on the touch screen to provide the desired swiping gesture.

Some alternative solutions may include releasing the touch object and repositioning the touch object in a different position on the touch screen from which it was released, and repeating a similar motion. However, in some applications, release of the touch object may be associated with a specific input to the device and/or application. For example, in a gaming environment, providing a swiping gesture may be associated with pulling a slingshot to apply tension. The longer the swiping gesture, the more tension that is applied. When the touch object is released, the virtual slingshot is also released. A user may therefore benefit from a method to extend the swiping gesture beyond the physical constraints of the touch screen.

As another example, a user panning a large document such as a map may repeatedly lift and repeat a swiping gesture. Such usage may result in fatigue for the user, and extensive processing resources used to refresh and display the corresponding portion of the map or other image.

A method, apparatus and computer program product are therefore provided in accordance with an example embodiment of the present invention for calculating a virtual touch position off the physical touch screen display. According to an example embodiment, a user may provide a swiping gesture, and upon reaching the edge of the physical touch screen display, continue or extend the swiping gesture along an edge of the physical touch screen display, thereby resulting in an extension of the swiping gesture. A touch position of the extension of the swiping gesture along an edge of the physical touch screen display may correlate to a virtual touch position that lies off the physical touch screen display. The virtual touch position may be calculated based on the distance and/or trajectory of the initial swiping gesture, for example.

Figure 1:
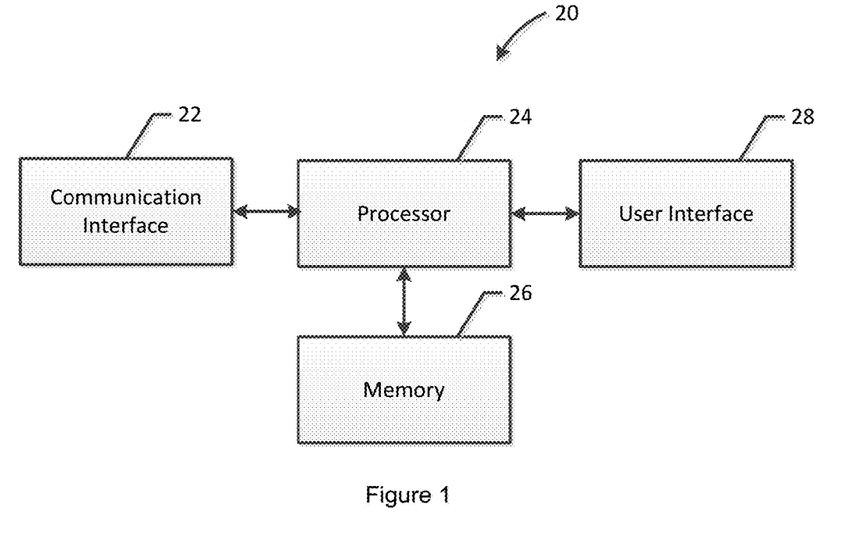
FIG. 1 is a block diagram of an apparatus according to an example embodiment of the present invention.

FIG. 1 is a schematic diagram of an example apparatus configured for performing any of the operations described herein. Apparatus 20 is an example embodiment that may be embodied by or associated with any of a variety of computing devices configured to include or communicate with a touch screen display. For example, the computing device may be a mobile telephone, smart phone, smart watch, tablet computer, camera, personal computer, laptop, personal digital assistant (PDA), or any combination of the aforementioned and other types of voice and text communications systems. In some embodiments, apparatus 20 need not be mobile but may be a fixed computing device.

Still further, apparatus 20 may be embodied by or associated with a plurality of computing devices that are in communication with or otherwise networked with one another such that the various functions performed by the apparatus may be divided between the plurality of computing devices that operate in collaboration with one another. For example, a user may control a handheld device or other user device having a touch screen display, and the user device may communicate information regarding user inputs to another device such as a server, personal computer, game console, and/or the like for processing the user inputs. The user device may be configured to communicate with the other device by direct wired connection, near field communication, or by any other protocol.

The apparatus 20 may include, be associated with, or may otherwise be in communication with an optional communication interface 22, a processor 24, a memory 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

According to example embodiments memory 26 may store computer program code that enables communication between apparatus 20 and another device, as described herein according to example embodiments. The computer program code may be provided as a factory install, or downloaded by a user of apparatus 20, for example.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display and/or other input/output mechanisms, such as but not limited to a keypad, camera, speaker, microphone and/or the like. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be configured to communication over a network, such as a local area network (LAN), cellular data network, and/or the Internet. In this regard, the communication interface 22 may include, for example, an antenna (or multiple antennas) and supporting hardware and/or software for enabling communications with a wireless communications network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication.

Figure 2:
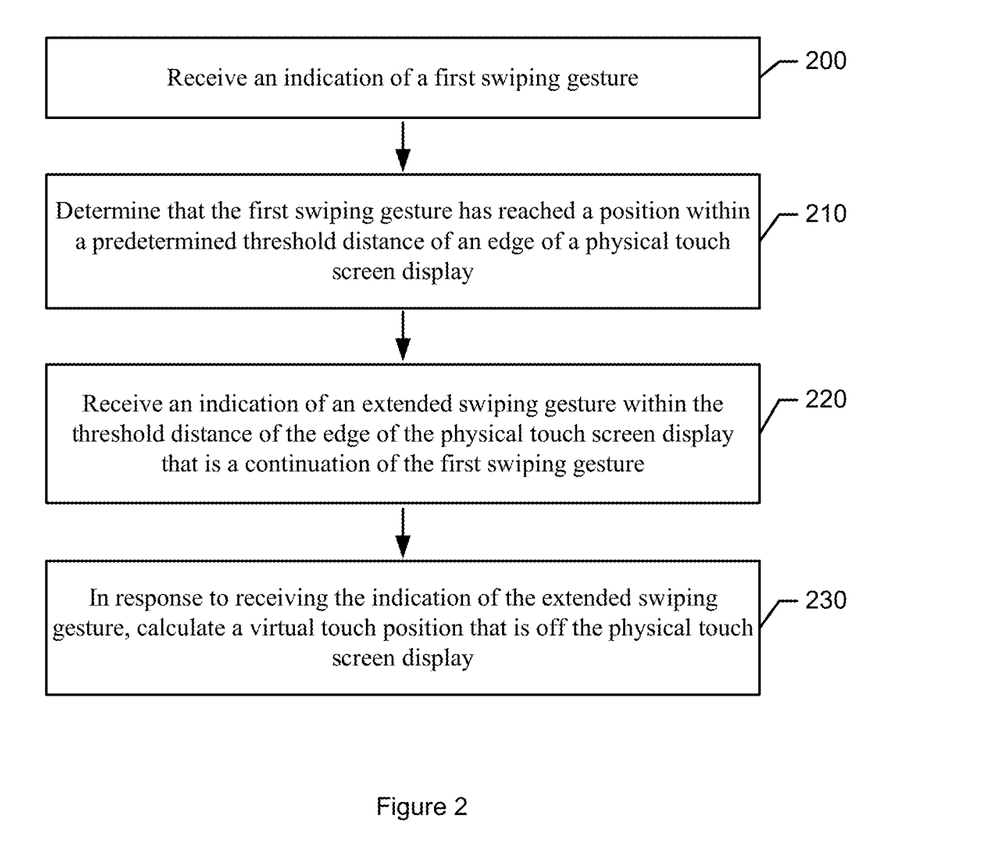
FIG. 2 is a flowchart of operations according to an example embodiment.

Having now described an example embodiment of apparatus 20, FIG. 2 provides operations that may be performed by apparatus 20 according to example embodiments. As shown by operation 200, apparatus 20 may include means, such as processor 24, communication interface 22, user interface 28 and/or the like, for receiving an indication of a first swiping gesture.

Figure 3A:
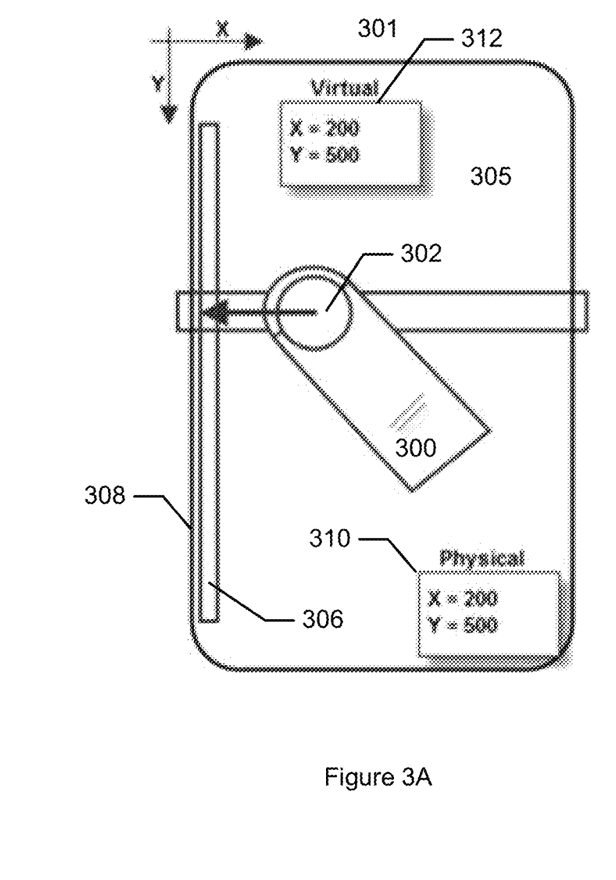
FIGS. 3A-3C, 4A-4C, 5A-5C, 6A, 6B, 7A, and 7B are illustrations of a user interacting with an apparatus according to an example embodiment.

As illustrated in FIG. 3A, the pointing object 300 (e.g., a user's finger, stylus, and/or the like), may contact the physical touch screen display 301 in position 302 as a start point of the first swiping gesture. The position 302 may be calculated relative to x and y axes, for example. In the example of FIG. 3A, the position 302 is on a main portion of the display 305 which may include any portion except area 306 of the touch screen display. In this regard area 306 may be defined as the area between the edge 308 and a predetermined threshold distance from the edge 308 (e.g., edge of the physical touch screen display and/or edge of the touch screen display surface). For example, the predetermined threshold distance may be a relatively small distance compared to the full size of the touch screen display. For example, the predetermined threshold distance may be measured in centimeters, e.g., a half centimeter, in pixels, e.g., 15 pixels, and/or the like. In some examples the predetermined threshold distance may be configured by a user, such with a device settings interface. It will be appreciated that area 306 may continue around the entire touch screen display 101 along edge 308 so as to form a picture frame, although not illustrated this way for simplicity in FIG. 3A and other example figures provided herein. In some examples, the area 306 may extend along one or more, such as a subset of all edges, but not all edges of the touch screen display. As another example, the area 306 may be defined based on a region proximate the edge of the touch screen display that include separate sensor(s) from those of the main portion of the display 305.

Position 302 of the touch input in FIG. 3A may have a corresponding physical position 310 and virtual position 312, which although depicted for clarity may not necessarily be displayed. The physical position coordinates 310 define a literal position of the touch input relative to the physical touch screen display 301. The virtual position coordinates 312 may correlate to a virtual touch position at which the physical position 310 may be interpreted by the processor 24 according to example embodiments. The virtual touch position may be provided to an application as input. The application need not be configured to distinguish virtual positions and physical positions, but rather the virtual position may be communicated to an application as if it were a physical position of a touch input. In the example of FIG. 3A, the virtual touch position and physical touch position are the same. The virtual touch position and physical touch position may be the same in scenarios in which the touch input is provided in the main portion of the display 305 (excluding area 306).

Figure 3B:
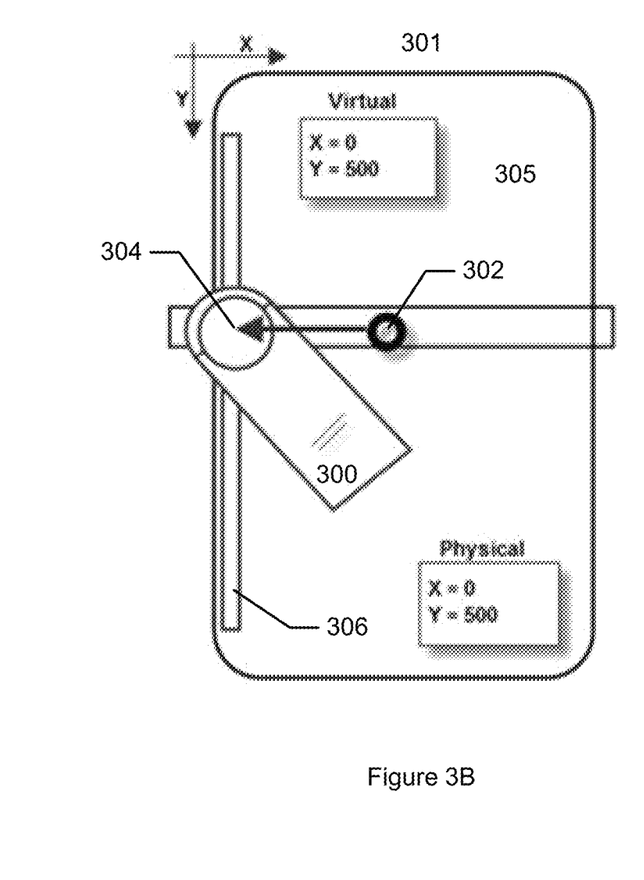

Returning to FIG. 2, as shown by operation 210, apparatus 20 may include means, such as processor 24, memory 26, user interface 28 and/or the like, for determining that the first swiping gesture has reached a position 304 within a predetermined threshold distance of an edge of a physical touch screen display or within an predefined region of a physical touch screen display, such as in area 306 illustrated in FIG. 3B. As illustrated, the virtual and physical positions remain the same, as the pointing object 300, such as a finger, stylus, and/or the like, remains in contact with the main portion of the display 305. However, the x-coordinate of the virtual and physical position changes relative to the x-coordinate of FIG. 3A because the user has swiped to the left.

Figure 3C:
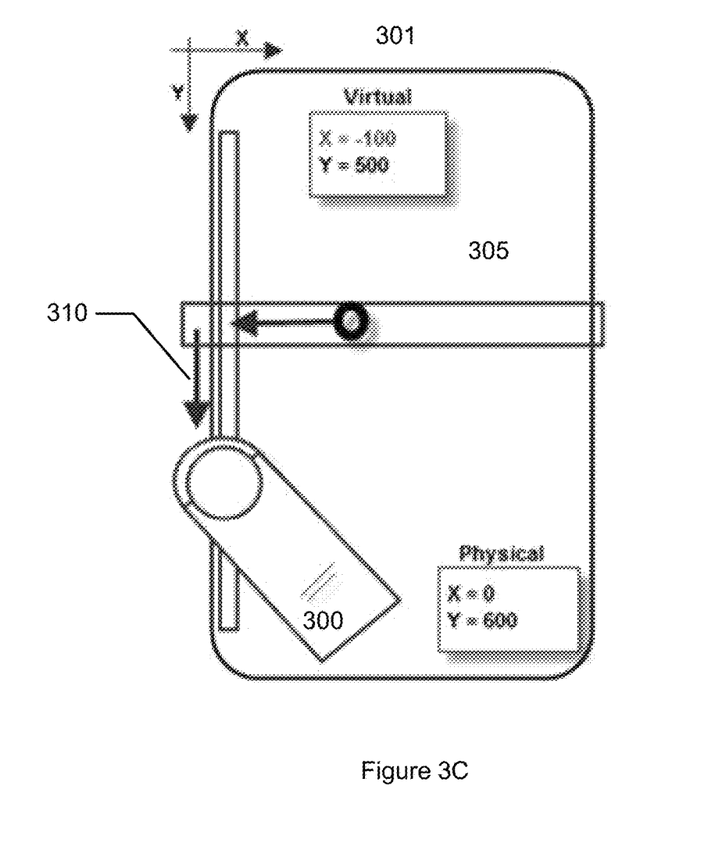

As shown by operation 220, apparatus 20 may include means, such as processor 24, user interface 28 and/or the like, for receiving an indication of an extended swiping gesture within the threshold distance of the edge of the physical touch screen display that is a continuation of the first swiping gesture. As illustrated in the example of FIG. 3C, the pointing object 300 continues downward while maintaining contact with the physical touch screen display 301 in area 300 proximate the edge of the physical touch screen display. The apparatus 20 identifies this input as an extended swiping gesture 320 that is a continuation of the first swiping gesture made within the threshold distance of the edge of the physical touch screen display.

As shown by operation 230, apparatus 20 may include means, such as processor 24, memory 26, and/or the like, for, in response to receiving the indication of the extended swiping gesture, calculating a virtual touch position that is off the physical touch screen display. While a virtual touch position may be off the physical touch screen display, the virtual touch position may nevertheless be defined or expressed in terms relative to the physical touch screen display. For example, when the y-axis is positioned along the left most edge of the physical touch screen display, a virtual touch position may include a negative x-coordinate.

As illustrated in FIG. 3C, the virtual position is different from the physical position once the user has made an extended swiping gesture. The calculation of the virtual position is based on an interpretation of the swiping gesture that the user wanted to continue the first swiping gesture in the same general direction. Therefore, while the y-coordinate of the physical position changes from 500 to 600, the y-coordinate of the virtual position remains 500, and the x-coordinate is adjusted by the difference of 100 pixels. In this regard, the virtual touch position may be calculated based on at least a distance of the extended swiping gesture. Additionally or alternatively, the virtual touch position may be calculated based on a trajectory of the first swiping gesture. That is, the trajectory of the first swiping gesture illustrated in FIG. 3B is at an angle of 0 degrees from the x-axis, and the virtual touch position may be calculated as if the same trajectory is continued beyond the edge of the physical touch screen. In this regard, the trajectory may be considered an average trajectory of the first swiping gesture (such as calculated by linear interpolation, for example, or a trajectory of a predetermined length of the first swiping gesture before the gesture reaches the area 306, for example). The magnitude or distance of the further movement along the edge of the physical touch screen display within area 306 may be equal, proportional and/or commensurate with a change in distance of the position of a virtual touch position compared to a last position of the first swiping gesture within the main portion of the display 305.

As a more specific exemplary calculation, coordinates of a virtual touch position may be calculated as $$(x_v, y_v) = (x_b, y_b) - \text{distance of the extended swiping gesture} * \left(\frac{x_a - x_b}{ab}, \frac{y_a - y_b}{ab}\right),$$

where a is first position of the first swiping gesture, such as position 302 of FIGS. 3A and 3B, and b is a second position of the first swiping gesture within the threshold distance of the edge, such as position 304 of FIG. 3B. ab is the distance between positions a and b. For example, with reference to FIGS. 3A-3C, assuming positions 302 and 304 are a and b respectively, $$(x_v, y_v) = (0, 500) - 100 * \left(\frac{200-0}{200}, \frac{500-500}{200}\right) =$$
$$(0, 500) - 100 * (1, 0) = (0, 500) - (100, 0) = (-100, 500).$$

The first position of the first swiping gesture may be determined in a variety of ways. For example, the apparatus 20 may base the calculation on a first touch position of the first swiping gesture, or any touch position along the first swiping gesture. As another example, the first swiping gesture provided by a user may be linearly interpolated so as to remove slight curvatures in the user's gesture. In such a scenario, any touch position in the first swiping gesture in the main portion of the display 305 may be used to assess the trajectory and calculate the virtual touch position according to the distance of the extended swiping gesture.

In addition to or instead of basing the determination of the virtual touch position upon the trajectory (including, for example, the curvature) of the first swiping gesture, the virtual touch position may be calculated based on the velocity and/or the acceleration of the first swiping gesture. For example, if the first swiping gesture had a relatively high velocity, the virtual touch position may be calculated as though the extended swiping gesture had continued with the same relatively high velocity. Similarly, if the first swiping gesture were accelerating upon entry within the threshold distance of the edge of the physical touch screen display, the virtual touch position may be calculated as though the extended swiping gesture had continued to accelerate with the same rate, thereby causing the virtual touch position to be placed by a greater distance than the length of the extended swiping gesture.

As described above, a virtual touch position corresponding to a position along an extended swiping gesture may be calculated according to example embodiments. In some examples the virtual touch position may be continuously recalculated as the extended swiping gesture continues. Additionally or alternatively, the virtual touch position may be recalculated on a repeated interval based on time, or change in distance of the extended swiping gesture, for example. As yet another example, the virtual touch position may be calculated in response to a release of the extended swiping gesture (e.g., removal of the pointing object from the physical touch screen display.)

Furthermore, if a pointing object transitions from providing an extended swiping gesture back into the main portion of the display 305, the virtual touch position may be recalculated based on the physical touch position. Additionally or alternatively, the virtual touch position may be recalculated as if the extended swiping gesture is being reversed. As such, apparatus 20 may include means, such as user interface 28, processor 24, and/or the like, for receiving an indication that the extended swiping gesture is no longer within the threshold distance of the edge of the physical touch screen display, and in response to receiving the indication that the extended swiping gesture is no longer within the threshold distance of the edge of the physical touch screen display, recalculating the virtual touch position.

In an example embodiment, the apparatus 20, such as the processor 24, requires a trigger following entry of the first swiping gesture within the threshold distance of the edge of the physical touch screen display prior to determining the virtual touch position. By requiring a trigger, the likelihood of determining a virtual touch position and acting thereupon in response to the first swiping gesture inadvertently coming within upon entry within the threshold distance of the edge of the physical touch screen display is reduced. The apparatus, such as the processor of this example embodiment may be configured to utilize various triggers including, for example, a requirement that the first swiping gesture pause for a predefined period of time prior to commencement of the extended swiping gesture or a requirement that the first swiping gesture including boucing in which the first swiping gesture repeatedly enters within (and exits from) the threshold distance of the edge of the physical touch screen display a predetermined number of times within a predefined period of time prior to remaining within the threshold distance of the edge of the physical touch screen display.

Figure 4A:
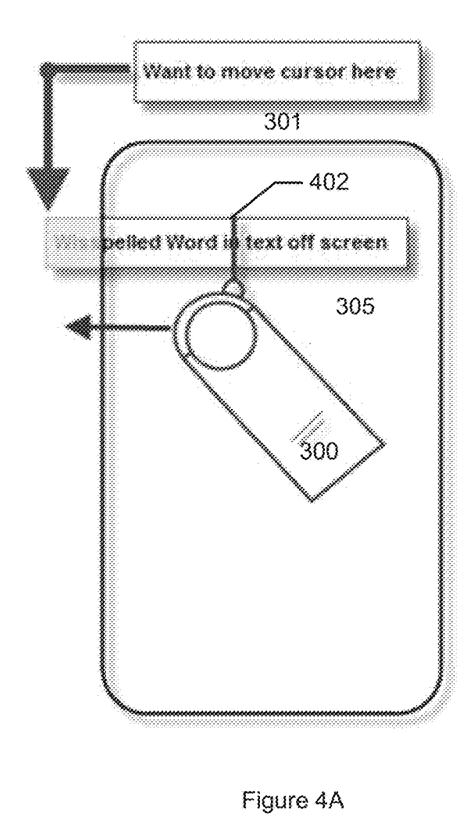
Figure 4B:
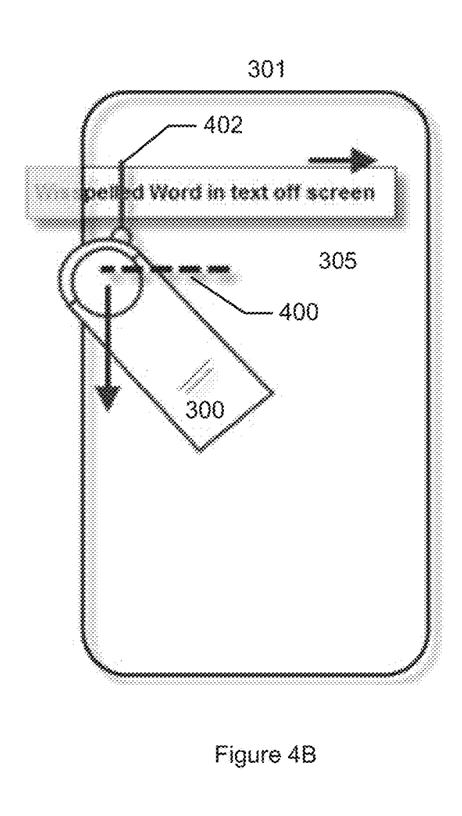
Figure 4C:
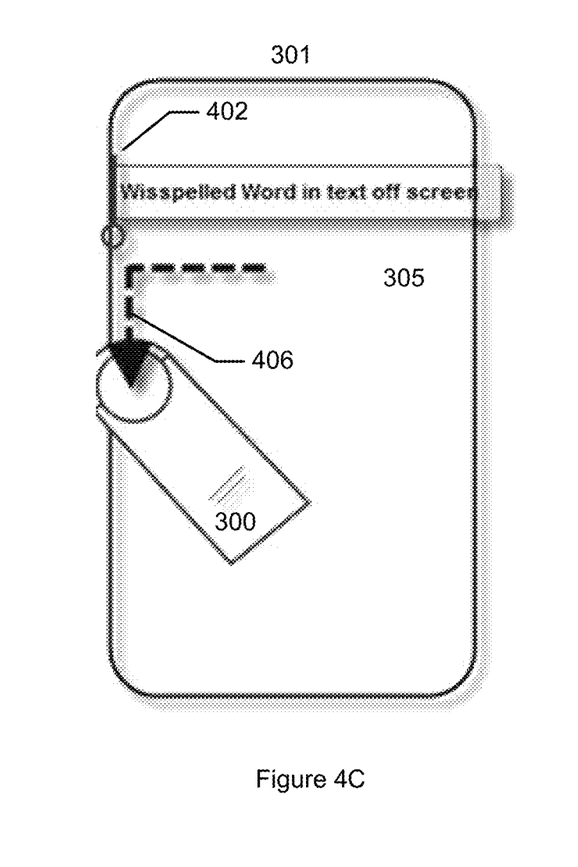

The remaining figures provide additional illustrations of calculating a virtual touch position according to example embodiments. FIGS. 4A-4C provide example illustrations of correcting a typographical error, according to example embodiments. In FIG. 4A, a user has realized there is misspelled word in the left most portion of the text input while the cursor 402 is not in a position to correct the mistake as a result of being displaced from the location of the misspelled word. As shown in FIG. 4B, the user provides a leftward and first swiping gesture 400 and the cursor 402 moves left. The pointing object 300 reaches the edge of the physical touch screen display before the cursor 402 moves to the desired position. According to example embodiments, and as illustrated in FIG. 4C, the user moves the pointing object 300 downward within the predefined threshold distance of the edge to provide an extended swiping gesture 406. According to example embodiments the downward extension of the swiping gesture is interpreted as if the swiping gesture had continued left with the same trajectory as previously provided in the first swiping gesture, and the cursor 402 may be placed in the desired position based on a virtual touch position calculated according to example embodiments, such as being placed at a position along the same trajectory that is spaced from the edge of the display by a distance equal to the magnitude of the extended swiping gesture.

Figure 5A:
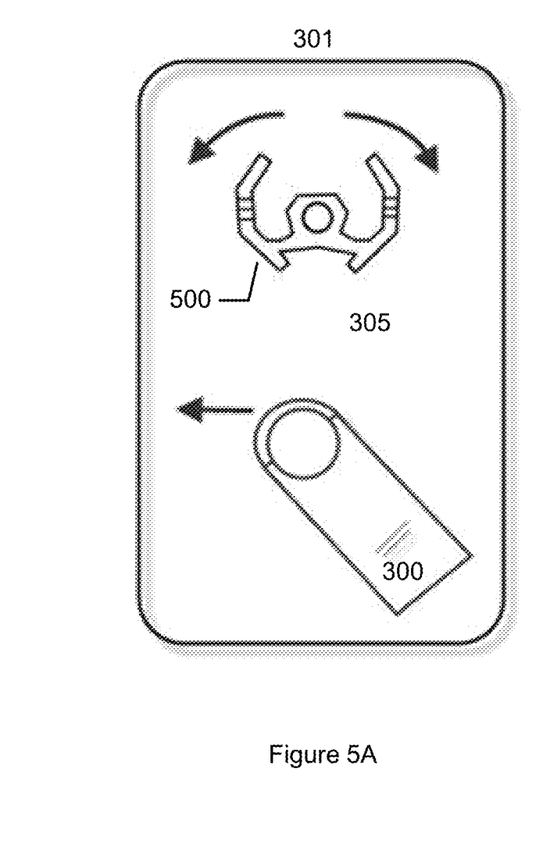
Figure 5B:
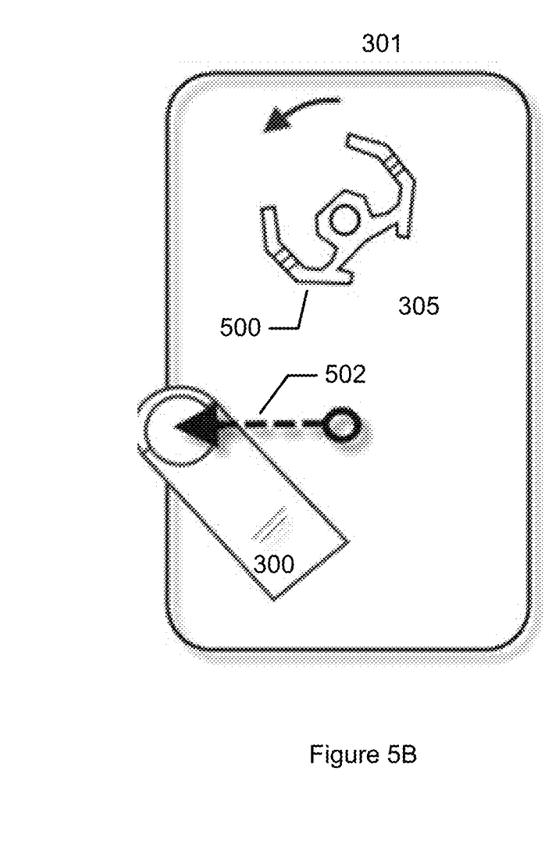
Figure 5C:
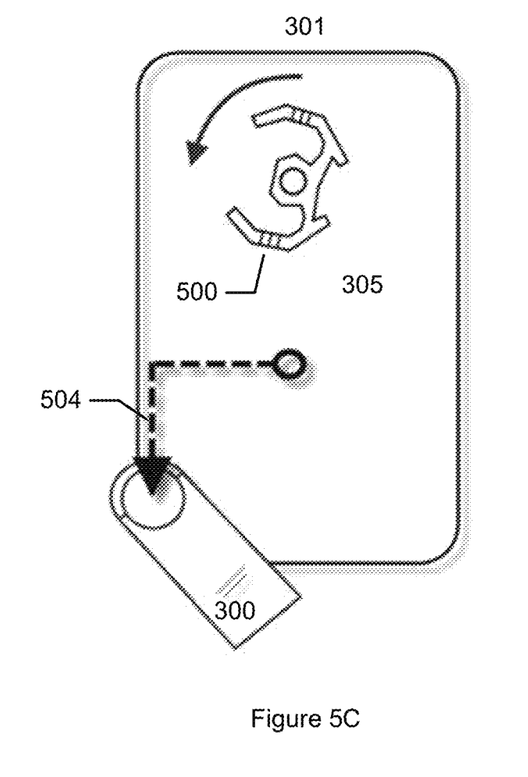

As another example, FIGS. 5A-5C illustrate a gaming scenario according to an example embodiment. As illustrated in FIG. 5A, a user wishes to turn the virtual wheel 500 counter-clockwise. As illustrated in FIG. 5B, the user turns the virtual wheel 500 counter-clockwise by providing a first swiping gesture 502 to the left. In FIG. 5B, the user cannot swipe left anymore, but wishes to continue turning the virtual wheel 500 without releasing the touch input. As illustrated in FIG. 5C, the user reaches a position within a threshold distance of the edge, and extends or continues the swiping gesture downward by providing an extended swiping gesture 504. As the user continues the extended swiping gesture, virtual touch point(s) may be calculated according to example embodiments provided herein, such as based on the trajectory of the first swiping gesture and/or distance of the extended swiping gesture. The virtual touch point(s) may be communicated to a gaming application, for example. In response, the wheel 500 may continue to turn. Example embodiments therefore enable a user to turn the wheel 500 further than otherwise possible on a small display screen without releasing the pointing object from the touch screen display. Example embodiments therefore provide improvements to such devices, especially in applications in which release of the pointing object prematurely causes another action to occur, such as allowing a car to veer off course in a game, or releasing a sling shot prior to the desired amount of tension being applied. Therefore a user of a device according to example embodiments may control such an application as desired without being limited by the touch screen display size.

Figure 6A:
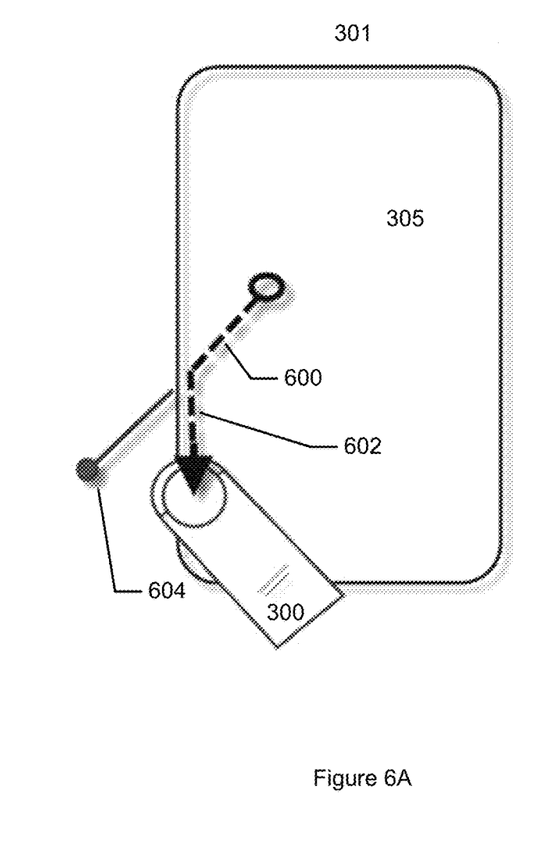
Figure 6B:
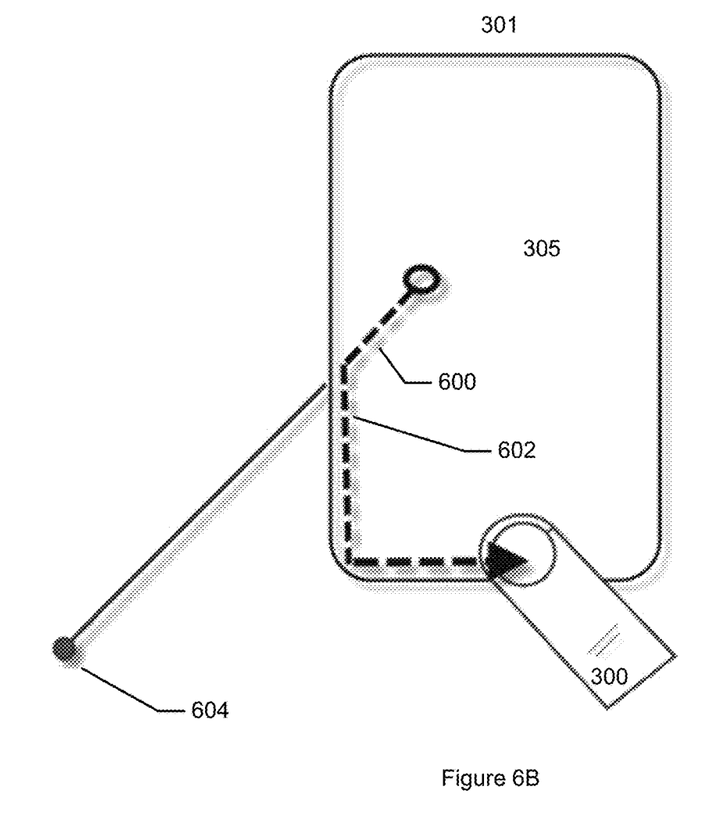

FIGS. 6A and 6B illustrate another example according to embodiments provided herein. As described above, a virtual touch position may be calculated based on the trajectory of the first swiping gesture and/or the distance of the extended swiping gesture. FIG. 6A illustrates a first swiping gesture 600, extended swiping gesture 602, and a corresponding calculated virtual touch position 604. In FIG. 6B, the extended swiping gesture 602 continues around a corner of the physical touch screen display 301 while remaining within the threshold distance of the edge of the physical touch screen display. Contact between the pointing object 300 and the physical touch screen display 301 is maintained, and the calculated virtual touch position moves even further away from the physical touch screen display.

As yet another example, although not illustrated, the extended swiping gesture may change direction while the pointing object remains within the threshold distance of the edge of physical touch screen display. In this regard, the virtual touch position may move in a reverse direction and based on a distance of the extended swiping gesture from the point of change in direction. Such functionality may enable a user to fine tune a selection point, cursor position, and/or the like.

Figure 7A:
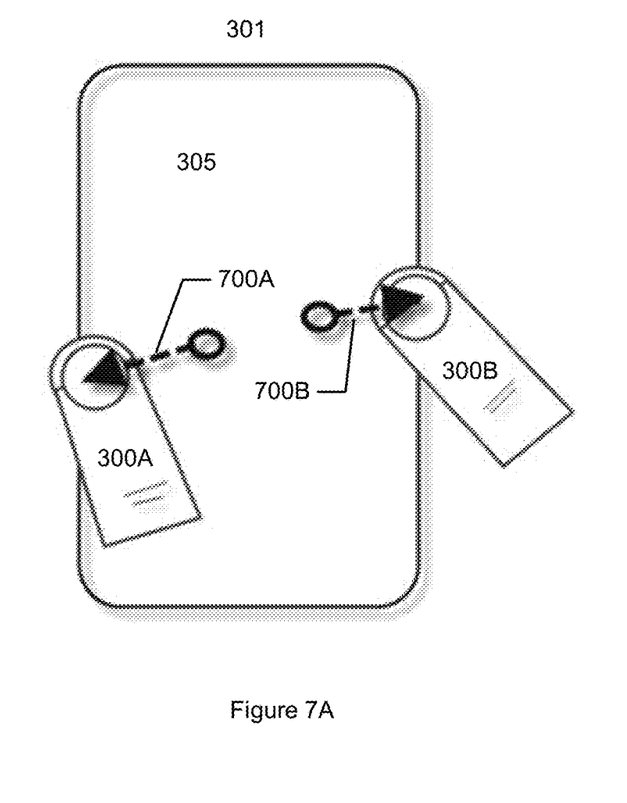
Figure 7B:
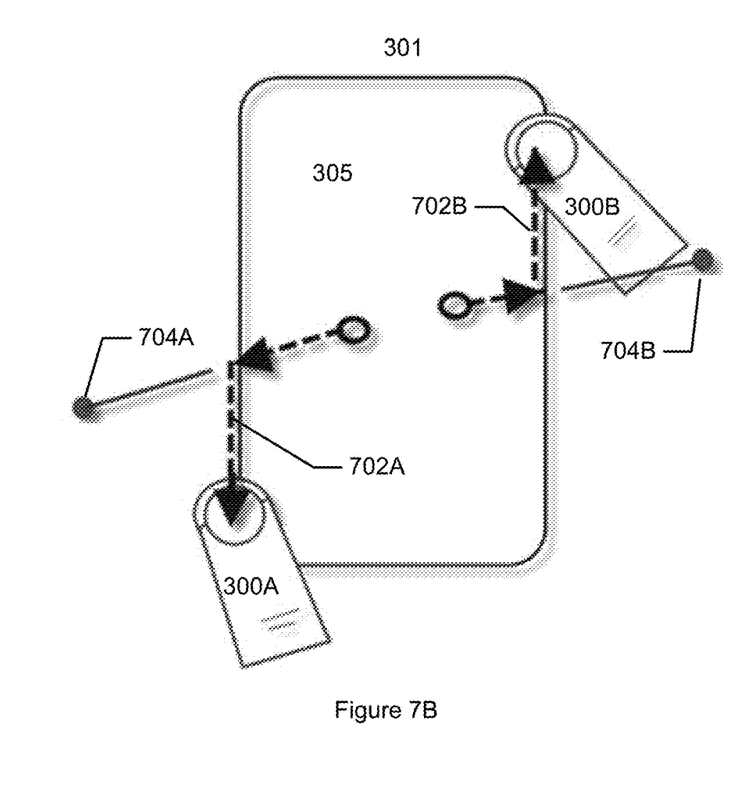

FIGS. 7A and 7B illustrate another example according the embodiments provided herein in which two first swiping gestures are provided together by the user. Similarly, two extended swiping gestures of the respective first swiping gestures may be provided. The apparatus 20 may therefore calculate two or more virtual touch positions and provided to an application as a single input. As illustrated in FIG. 7A, two pointing objects 300A and 300B may perform respective first swiping gestures 700A and 700B. As illustrated in FIG. 7B, two respective extending swiping gestures 702A and 702B may be provided. Apparatus 20 may therefore calculate two respective virtual touch positions 704A and 704B. Such an embodiment may be applicable to zooming, expanding, or similar functionality requiring that two or more swiping gestures be provided and/or two or more touch points be maintained. In some examples, any number of virtual touch positions may be calculated and provided at any given time. This may allow a user to zoom out, for example, as far as desired with one input, instead of repeating an input gesture several times to achieve the desired zoom level.

As described above, example embodiments provide for an extended swiping gesture and virtual touch position, enabling users to infinitely continue a swiping gesture and provide a virtual touch position removed as far from the physical touch screen display as desired. Example embodiments provide an extended virtual touch screen display regardless of size constraints of the physical touch screen display. As a result, users may experience improved usability with certain applications. In some instances, users may direct certain applications to perform operations otherwise impossible due to the size constraints of the touch screen display, where otherwise a premature release of a touch input during a swiping gesture may have undesirable consequences.

As such, the method, apparatus and computer program product provide numerous technical advantages including the conservation of processing resources and the associated power consumption otherwise expended for a user to provide desired input to a touch screen display. For example, alternative implementations in which a user may provide a swiping gesture, and lift the pointing object to repeat a similar gesture, may rely on a processor to repeatedly calculate an updated touch position and refresh a displayed view (such as in the example of panning on a display), based on repetition of swiping gestures starting and/or ending at the same approximate position.

As described above, FIG. 2 illustrates a flowchart of operations of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving an indication of a first swiping gesture having a gesture trajectory in a first direction;
    determining that the first swiping gesture across a physical touch screen display has reached a position on the physical touch screen display within a predetermined threshold distance of an edge of the physical touch screen display in the first direction;
    receiving an indication of an extended swiping gesture on the physical touch screen display between the threshold distance and the edge of the physical touch screen display that is a continuation of the first swiping gesture extending a first distance within an area between the threshold distance and an edge of the physical touch screen display in a direction different from the gesture trajectory in the first direction;
    wherein the extended swiping gesture changes direction while remaining within the threshold distance of the edge of the physical touch screen display
    in response to receiving the indication of the extended swiping gesture, calculating, with a processor, a virtual touch position that is off the physical touch screen display in the first direction;
    wherein the virtual touch position is calculated based on the gesture trajectory in the first direction and the first distance of the extended swiping gesture.

2. The method of claim 1, wherein the virtual touch position is calculated based on at least a velocity or an acceleration of the first swiping gesture.

3. The method of claim 1, further comprising calculating two virtual touch points as a part of a single input.

4. The method of claim 1, wherein the virtual touch position is calculated further in response to a release of the extended swiping gesture.

5. The method of claim 1, further comprising:
    receiving an indication that the extended swiping gesture is no longer within the threshold distance of the edge of the physical touch screen display; and in response to receiving the indication that the extended swiping gesture is no longer within the threshold distance of the edge of the physical touch screen display, recalculating the virtual touch position.

6. An apparatus comprising at least one processor and at least one memory including computer program code, the at least one memory and the computer program code configured to, with the processor, cause the apparatus to at least:
receive an indication of a first swiping gesture having a gesture trajectory in a first direction;
determine that the first swiping gesture across a physical touch screen display has reached a position on the physical touch screen display within a predetermined threshold distance of an edge of the physical touch screen display in the first direction;
receive an indication of an extended swiping gesture on the physical touch screen display between the threshold distance of the edge and the physical touch screen display that is a continuation of the first swiping gesture extending a first distance within an area between the threshold distance and an edge of the physical touch screen display in a direction different from the gesture trajectory in the first direction;
wherein the extended swiping gesture changes direction while remaining within the threshold distance of the edge of the physical touch screen display; and
in response to receiving the indication of the extended swiping gesture, calculate a virtual touch position that is off the physical touch screen display in the first direction;
wherein the virtual touch position is calculated based on at least the gesture trajectory in the first direction and the first distance of the extended swiping gesture.

7. The apparatus of claim 6, wherein the virtual touch position is calculated based on at least a velocity or an acceleration of the first swiping gesture.

8. The apparatus of claim 6, wherein the at least one memory and the computer program code are further configured to cause the apparatus to at least calculate two virtual touch points as a part of a single input.

9. The apparatus of claim 6, wherein the virtual touch position is calculated further in response to a release of the extended swiping gesture.

10. The apparatus of claim 6, wherein the at least one memory and the computer program code are further configured to cause the apparatus to at least:

receive an indication that the extended swiping gesture is no longer within the threshold distance of the edge of the physical touch screen display; and
in response to receiving the indication that the extended swiping gesture is no longer within the threshold distance of the edge of the physical touch screen display, recalculate the virtual touch position.

11. A computer program product comprising at least one non-transitory computer-readable storage medium having computer-executable program code instructions stored therein, the computer-executable program code instructions comprising program code instructions to:
receive an indication of a first swiping gesture having a gesture trajectory in a first direction;
determine that the first swiping gesture across a physical touch screen display has reached a position on the physical touch screen display within a predetermined threshold distance of an edge of the physical touch screen display in the first direction;
receive an indication of an extended swiping gesture on the physical touch screen display between the threshold distance and the edge of the physical touch screen display that is a continuation of the first swiping gesture extending a first distance within an area between the threshold distance and an edge of the physical touch screen display in a direction different from the gesture trajectory in the first direction;
wherein the extended swiping gesture changes direction while remaining within the threshold distance of the edge of the physical touch screen display; and
in response to receiving the indication of the extended swiping gesture, calculate a virtual touch position that is off the physical touch screen display in the first direction;
wherein the virtual touch position is calculated based on the gesture trajectory in the first direction and the first distance of the extended swiping gesture.

12. The computer program product of claim 11, wherein the virtual touch position is calculated based on at least a velocity or an acceleration of the first swiping gesture.

13. The computer program product of claim 11, wherein the computer-executable program code instructions further comprise program code instructions to calculate two virtual touch points as a part of a single input.

14. The computer program product of claim 11, wherein the virtual touch position is calculated further in response to a release of the extended swiping gesture.

* * * * *